(12) United States Patent
Zimmerman

(10) Patent No.: US 10,834,864 B2
(45) Date of Patent: Nov. 17, 2020

(54) MANURE APPLICATION TOOLBAR

(71) Applicant: Nathan Zimmerman, Norwood Young America, MN (US)

(72) Inventor: Nathan Zimmerman, Norwood Young America, MN (US)

(73) Assignee: Hydro Operating LLC, Norwood Young America, MN (US)

( * ) Notice: Subject to any disclaimer, the term of this patent is extended or adjusted under 35 U.S.C. 154(b) by 147 days.

(21) Appl. No.: 15/932,255

(22) Filed: Feb. 16, 2018

(65) Prior Publication Data

US 2019/0069469 A1 Mar. 7, 2019

Related U.S. Application Data

(60) Provisional application No. 62/460,077, filed on Feb. 16, 2017.

(51) Int. Cl.
*A01B 73/06* (2006.01)
*A01C 23/00* (2006.01)

(52) U.S. Cl.
CPC .......... *A01B 73/065* (2013.01); *A01C 23/003* (2013.01); *A01C 23/008* (2013.01)

(58) Field of Classification Search
CPC ....... A01B 73/065; A01B 73/06; A01B 73/02; A01B 63/16; A01C 23/003; A01C 23/008; A01C 23/00
See application file for complete search history.

(56) References Cited

U.S. PATENT DOCUMENTS

| | | | | |
|---|---|---|---|---|
| 4,171,022 A | * | 10/1979 | Applequist | A01B 73/065 172/311 |
| 4,299,292 A | * | 11/1981 | Hughes | A01B 73/065 172/311 |
| 4,596,290 A | * | 6/1986 | Bedney | A01B 73/065 172/311 |
| 4,721,167 A | * | 1/1988 | Salley | A01B 59/04 172/311 |
| 8,141,652 B2 | * | 3/2012 | Poole | A01B 73/065 172/311 |
| 8,342,256 B2 | * | 1/2013 | Adams | A01B 73/02 172/311 |
| 9,763,376 B2 | * | 9/2017 | Blackwell | A01C 7/08 |
| 10,117,377 B2 | * | 11/2018 | Dienst | A01B 63/22 |
| 2006/0090910 A1 | * | 5/2006 | Houck | A01B 59/042 172/272 |

(Continued)

*Primary Examiner* — Jamie L McGowan

(74) *Attorney, Agent, or Firm* — Craig F. Taylor

(57) ABSTRACT

Apparatus and methods for applying manure to fields. Some apparatus and methods maintain constant height of a manure supply swing pipe above the ground during use. Pivotally mounted side wings supported by tracks or wheels and carrying manure applicators such and shanks and coulters can be carried along side of and secured to the apparatus tongue in a narrow configuration above the ground for transport and deployed in a wide configuration on the ground during use. Center rear mounted manure applicators are movable off the ground for transport using hydraulics in some apparatus. Some apparatus have the pivotally mounted side wings pivoted well inside of the outer most extent of the read center region to provide a narrower transport configuration.

13 Claims, 7 Drawing Sheets

(56) References Cited

U.S. PATENT DOCUMENTS

| | | | |
|---|---|---|---|
| 2013/0233580 A1* | 9/2013 | Kinzenbaw | A01B 73/065 |
| | | | 172/1 |
| 2015/0223387 A1* | 8/2015 | Lykken | A01B 73/065 |
| | | | 172/388 |
| 2015/0319912 A1* | 11/2015 | Stevenson | A01B 73/06 |
| | | | 172/669 |
| 2017/0006762 A1* | 1/2017 | Dienst | A01B 73/065 |
| 2018/0125001 A1* | 5/2018 | Zoske | A01C 23/02 |
| 2019/0124822 A1* | 5/2019 | Czapka | A01B 73/065 |
| 2019/0239415 A1* | 8/2019 | Crucianelli | A01B 73/06 |
| 2019/0313568 A1* | 10/2019 | Anderson | A01B 49/06 |

* cited by examiner

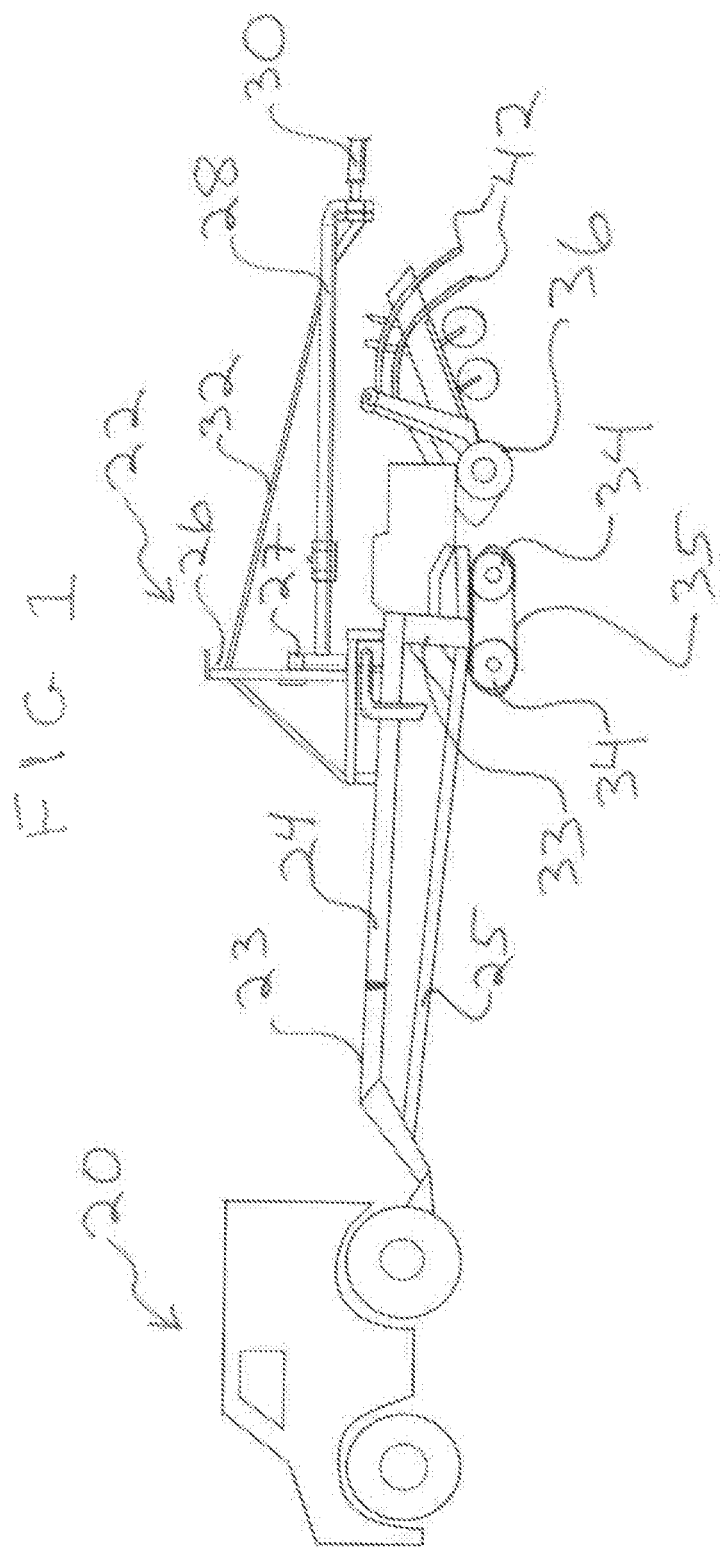

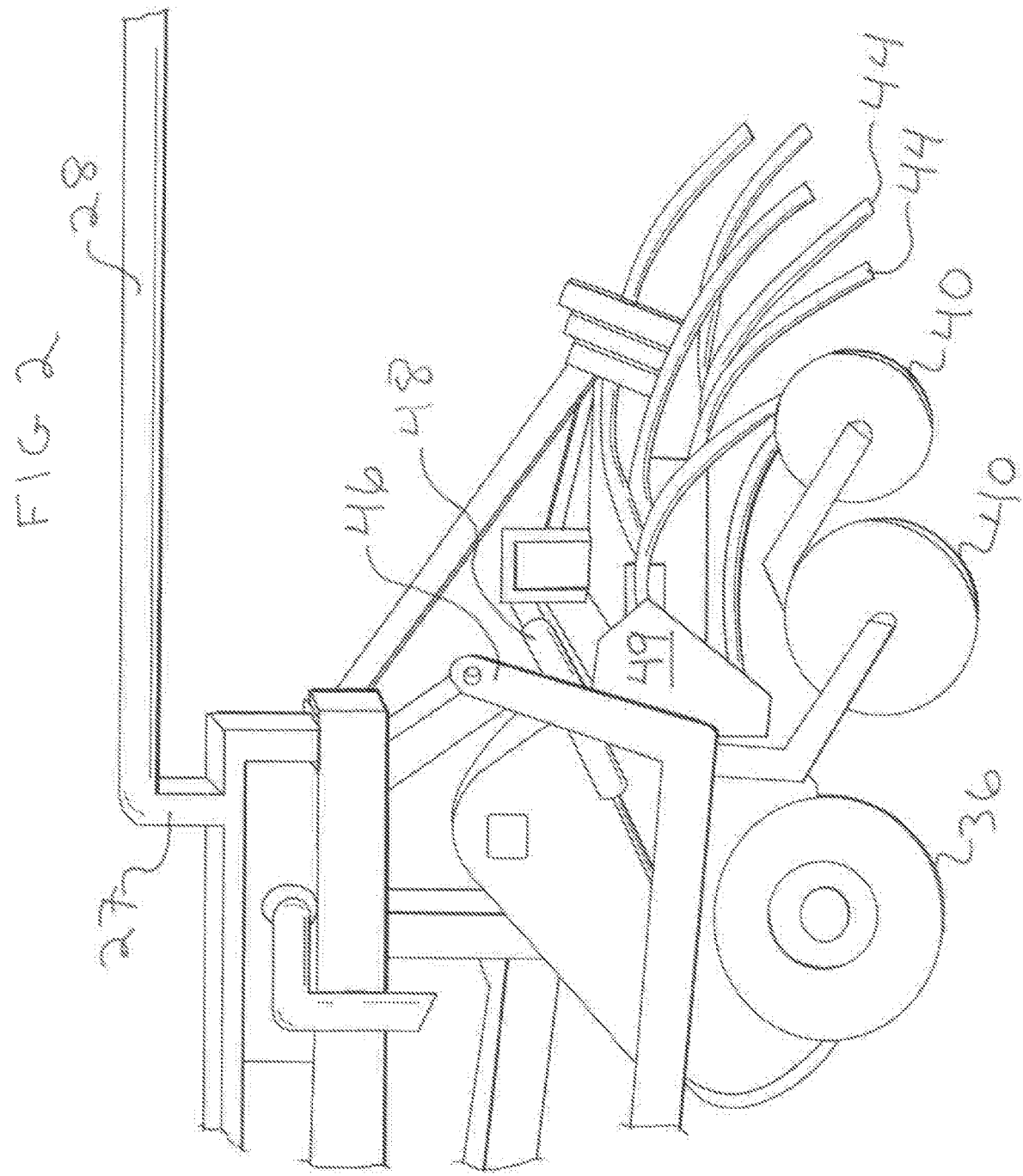

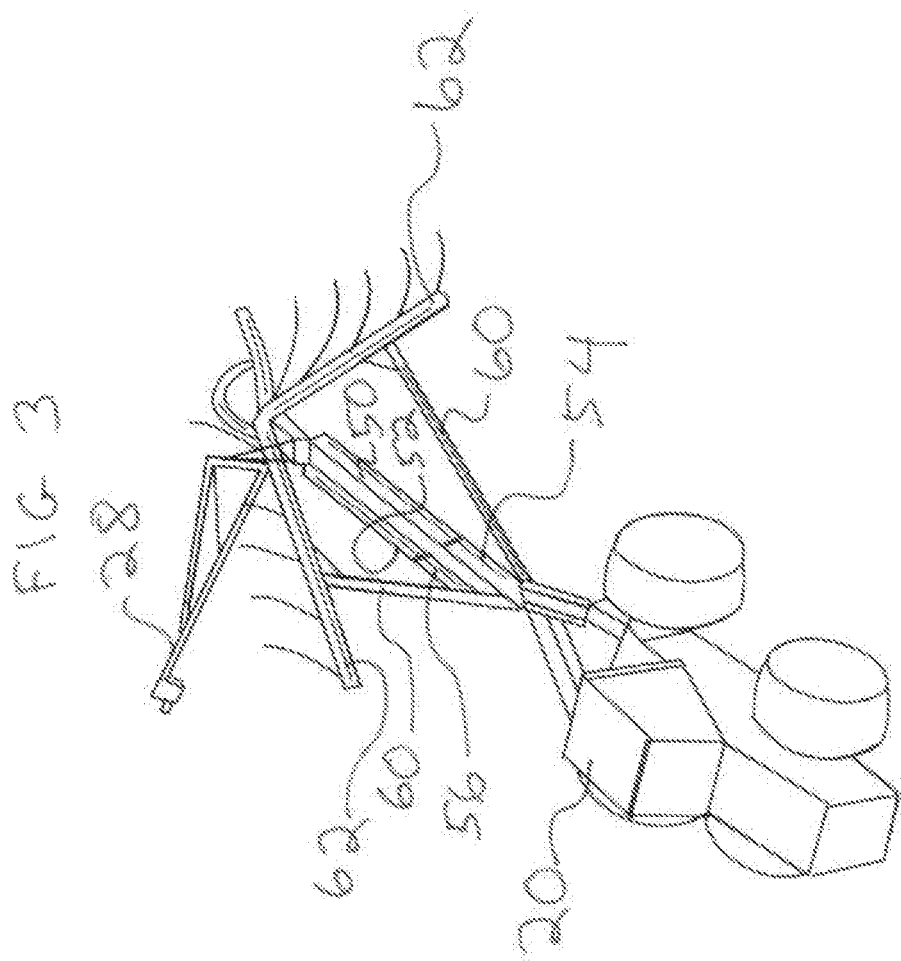

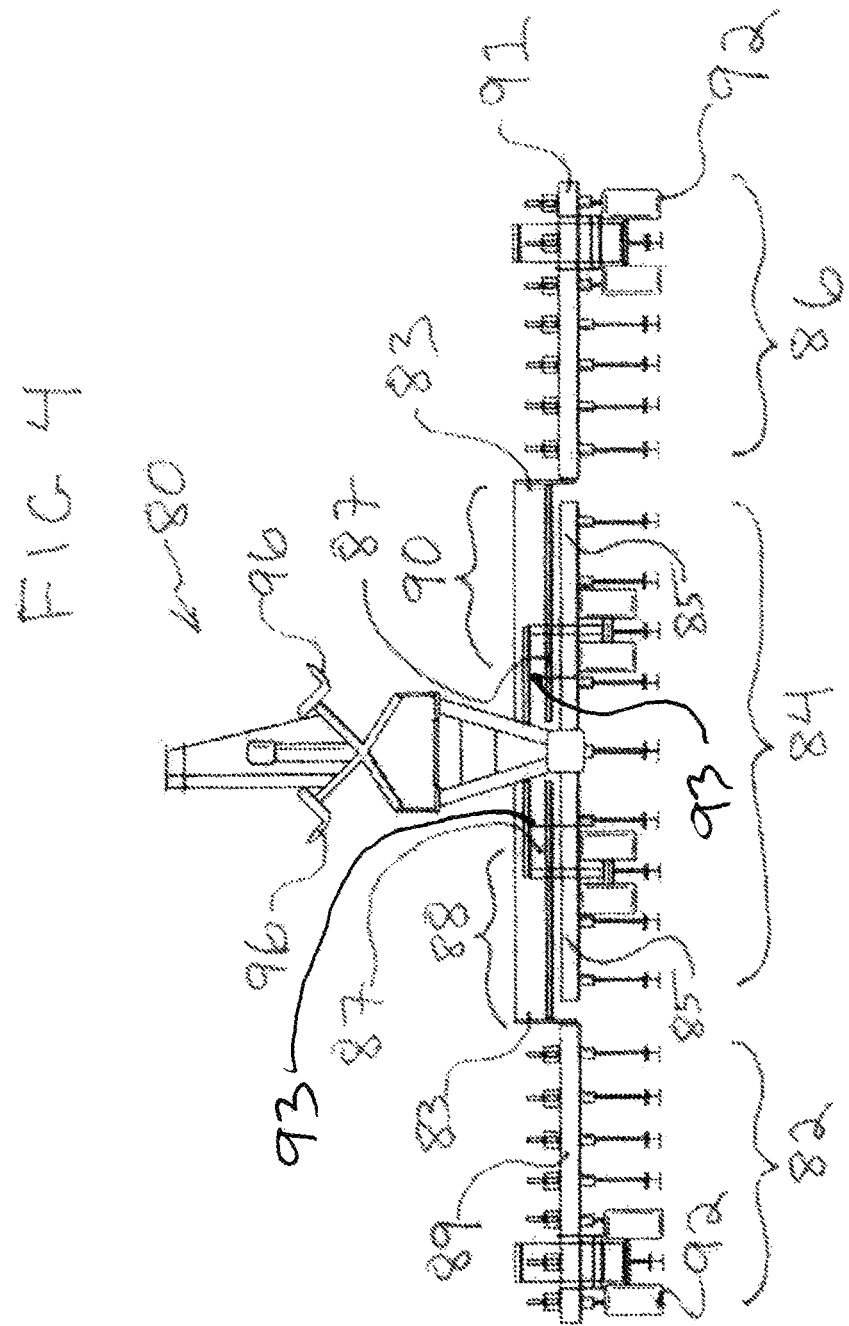

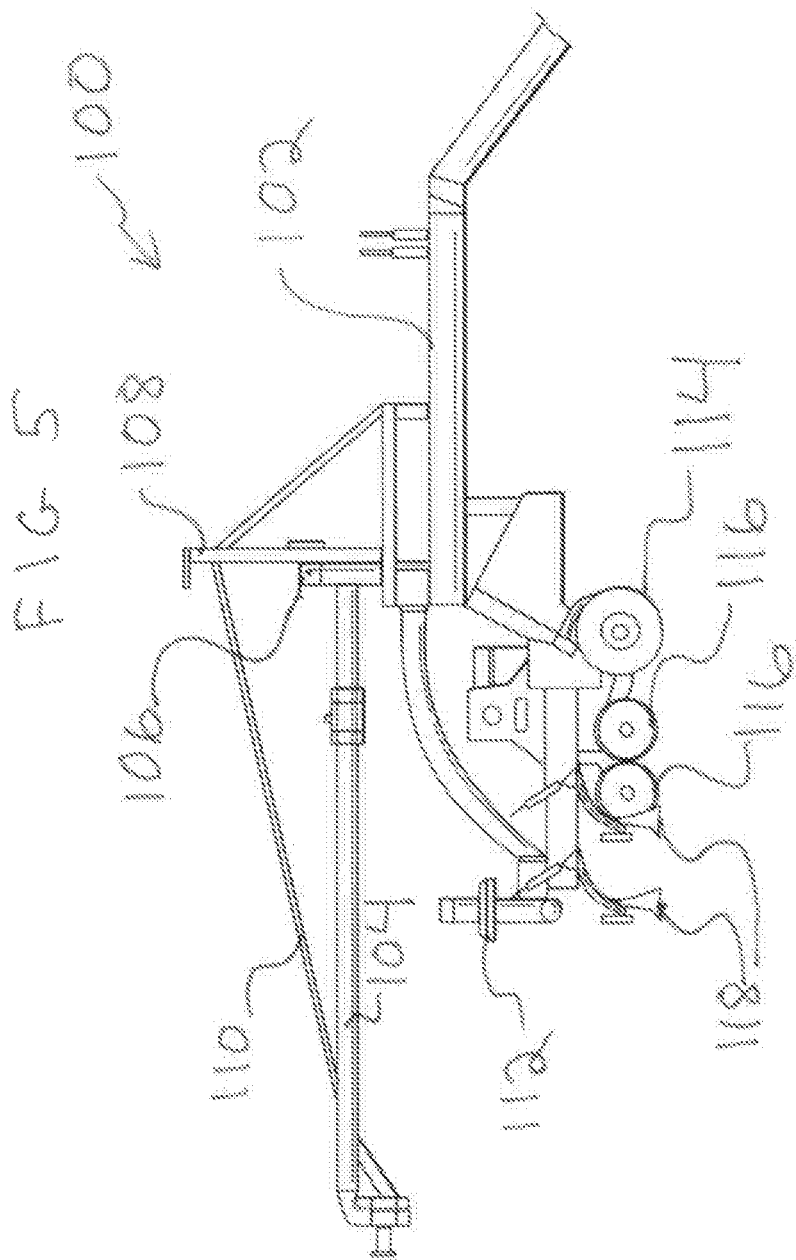

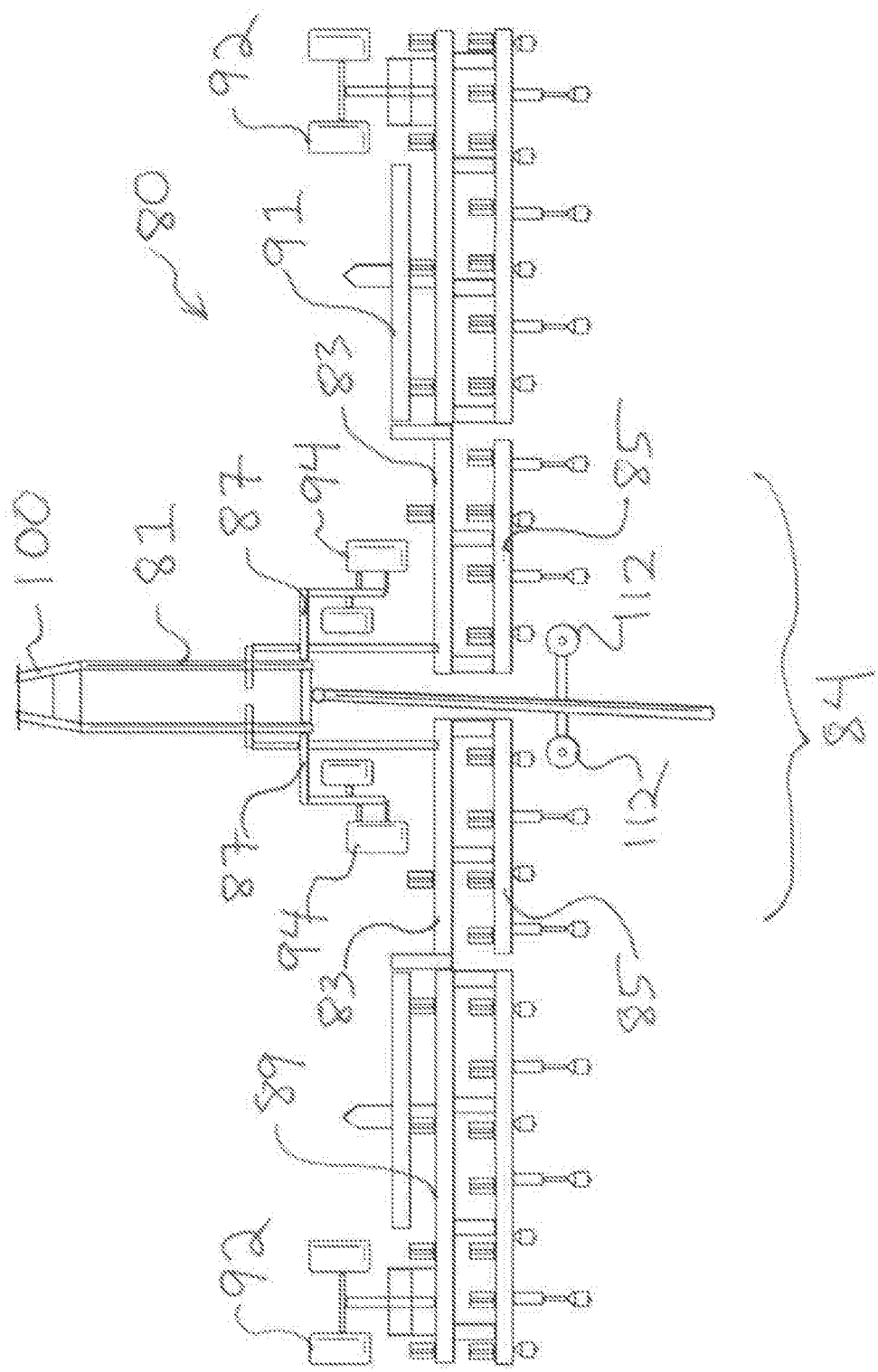

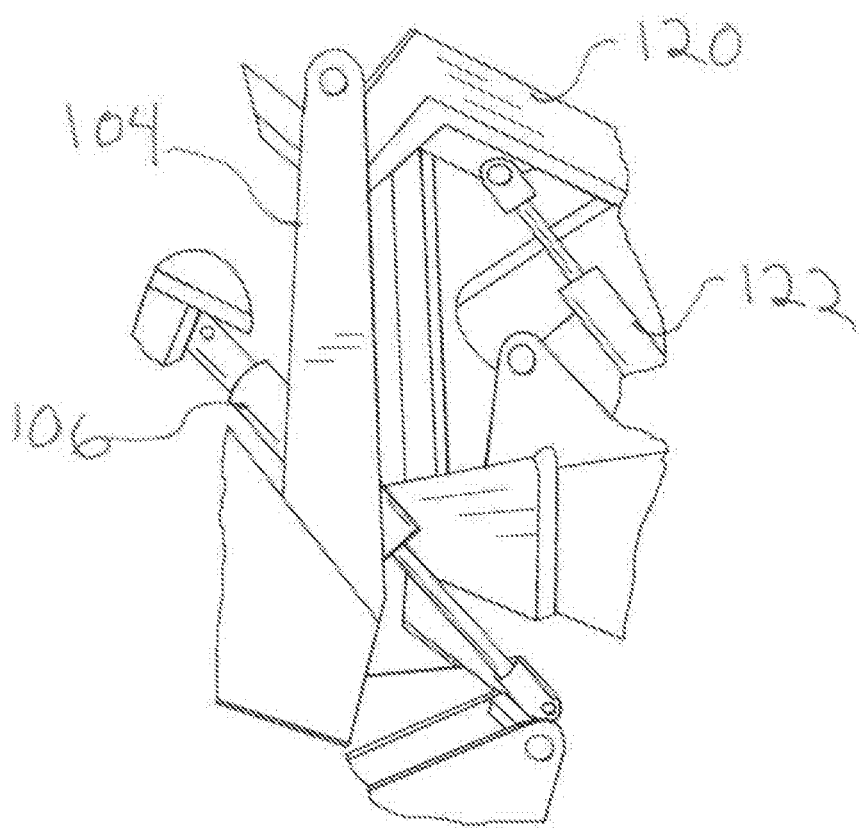

US 10,834,864 B2

MANURE APPLICATION TOOLBAR

RELATED APPLICATIONS

The present application is a non-provisional of U.S. Provisional Patent Application No. 64/460,077, filed Feb. 16, 2017 for MANURE APPLICATION TOOLBAR, the entirety of which is hereby incorporated by reference.

TECHNICAL FIELD

The present invention is related generally to devices and methods for applying manure to fields. More specifically, some embodiments include devices and methods which inject manure into fields using shanks, are very wide, but can be folded into narrow yet low height configurations for transport.

SUMMARY

The present invention includes apparatus and methods for applying manure to fields. Some apparatus and methods maintain constant height of a manure supply swing pipe above the ground during use. Pivotally mounted side wings supported by tracks or wheels and carrying manure applicators such as shanks and coulters can be carried alongside of and secured to the apparatus tongue in a narrow configuration above the ground for transport and deployed in a wide configuration on the ground during use. Center rear mounted manure applicators are movable off the ground for transport using hydraulics in some apparatus. Some apparatus have the pivotally mounted side wings pivoted well inside of the outer most extent of the rear center region to provide a narrower transport configuration. In some embodiments, the pivot point for the side wings is located inward of the outer most extent of the center region wheels.

BRIEF DESCRIPTION OF THE DRAWINGS

FIG. 1 is a side, schematic view a tractor pulling a toolbar having a swing pipe support pivotally coupled to the toolbar and supporting a pivotally mounted swing pipe which is coupled to a manure hose for supplying manure to the field.

FIG. 2 is side, rear, schematic fragmentary view of the embodiment of FIG. 1 showing a disc or coulter, an arm carrying a shank, and manure hoses for supplying the manure to the shanks, pivotally coupled so as to move them off of the ground.

FIG. 3 is a top, schematic, perspective view of the embodiment of FIG. 2 showing the tongue partially drawn out and extended, pulling the outer struts so as to draw in the wings carrying the wing mounted manure applicators/injectors.

FIG. 4 is an end view of another embodiment of the invention having a rigidly mounted center wheel frame, a vertically pivotally mounted center manure application frame, and two side wing manure application frames horizontally pivotally mounted to the center wheel frame.

FIG. 5 is a side view of one embodiment having a swing pipe pivot, a swing pipe, a swing pipe support pivot, and a swing pipe support.

FIG. 6 is a top view of the embodiment of FIG. 4.

FIG. 7 is a rear fragmentary view of an embodiment having the side wings lifted by lifting arms and lifting cradles.

DESCRIPTION

FIG. 1 illustrates a tractor 20 coupled to one embodiment of a toolbar 22 according to the present invention. This illustration is highly diagrammatic, not showing every aspect of this embodiment, illustrated in other FIGs. This embodiment includes a center tongue which in this example includes a center outer tube 24 to the rear of the tongue and a center inner tube 23 slidably disposed within the outer tube 24 to the front of the tongue. In this example, there are actually two center outer tubes each having an inner tube disposed within. A side strut 25 is coupled to a side wing (not shown in FIG. 1). When inner tube 23 is allowed to pull out from outer tube 24 the tongue elongates and side strut 25 can pull the side wings forward and inward for road transport. A swing pipe pivot 27 is pivotally coupled to the toolbar to support a swing pipe 28 which is coupled to a manure hose 30 for supplying shanks 42 to the far rear. A swing pipe support 32 supports the swing pipe 28 from a swing pipe support pivot 26. In this example, there are center tracks 35 around center wheels 34 supporting the center portion 33 with the more outer wing wheels 36 on the wings on either side providing wing support. In this illustration, the center application frame is vertically pivoted to raise the center rear manure application shanks and coulters. The wing mounted application shanks and coulters are not shown.

FIG. 2 is highly diagrammatic, not showing every aspect of this embodiment, which is illustrated in other FIGs. FIG. 2 illustrates the embodiment of FIG. 1 showing a side wing having a wing frame 49, and a wing wheel 36 as previously described and a disc or coulter 40, an arm 42 carrying a shank 44 and manure hoses for supplying the manure to the shanks 44 for manure injection. A hydraulic cylinder 48 is shown for lifting the coulters and shanks off the ground. A wing lifting arm 46 is shown, which can be grasped by lifting cradles to carry the side wings off the ground for transport. Swing pipe 28 and swing pipe pivot 27 are as previously described.

Pivotally raising the wing shanks and coulters can allow the wings to be drawn in toward the tongue and supported in the transport cradles. In some embodiments, the wing wheels support the wings while the coulters and shanks are raised to allow the wings to be moved toward the tongue or away from the tongue. A wing lifting arm 46 may also be seen. In this view, the wing lifting arm is angled rearward. The wing lifting arm travels with the wing as the wing is rotated toward the transport cradles. The wing lifting arm can be secured by the transport cradles which can then be raised to carry the entire wing and wing wheels off of the ground for transport.

FIG. 3 shows an embodiment from above. The tongue may be seen to include two center inner tubes 54 and 56 and two center outer tubes 50 and 52. Wing struts 60 may be seen coupled to the inner tubes 54 and 56. As tractor 20 pulls the inner tubes 54 and 56 from outer tubes 50 and 56 the tongue elongates, pulling side wings 62 forward and inward through the action of side struts 60. When pulled forward and inward the side wings 62 may be lifted up for road transport. Swing pipe 28 is also shown as previously described.

FIG. 4 illustrates another embodiment toolbar 80 of the invention. This figure illustrates a left wing region 82, a center frame region 84, a right wing region 86, wing overlap regions 88 and 90, and transport cradles 96. The wing overlap regions are regions 88 and 90 which overlap the center frame region 84 and may not carry discs, coulters, or shanks in some embodiments. Center frame region 84 can include a center wheel frame 87 rigidly coupled to the tongue and to the center wheels, thus holding the swing pipe at a constant height above the ground during manure application.

A more rearward center manure application frame 85 can carry the center coulters and shanks and be pivotally coupled to the center wheel frame so as to allow the center coulters and shanks to be pivoted upward and forward off the ground for transport. The wing overlap regions 88 and 90 having wing overlap frames 83 can be pivotally coupled to the center frame region inward of the maximum outer extent of the center frame. The wing overlap frame 83 can allow the wings to fold more closely inward toward the tongue than if the wings were pivotally coupled directly to the outermost portion of the center frame. In some embodiments, the pivot point 93 is located inward of the outermost extent of the center region wheels 94. This wing overlap region may also provide a greater strength by overlapping with the center frame as opposed to being pivotally coupled at a point at the outermost portion of the center frame. Having the wing overlap regions be pivotally coupled to the center frame allows the wings to be swung inward closer and be grasped and the wings lifted by the transport cradles 96 grasping the wing lifting arms, ready for transport. In various embodiments, the distance between the outermost extend of the center frame and the more inward pivot point for the wings are at least 1 foot, 2 feet, or 3 feet.

As can be seen in this figure, the wings and center frame each have discs, shanks, coulters, depending on the embodiment. The wing discs, coulters, shanks can be pivotally raised off of the ground as can the corresponding manure injection devices on the center frame region. The wing wheels can be used to allow the wings to fold forward and inward while the wing wheels are still supporting the weight of the wings. The wings can then be lifted off of the ground partially or totally by the transport cradles. In this embodiment, the wing wheels can be lifted off the ground while the center frame wheels are not. In some embodiments, the wheels can be replaced or augmented by tracks, to provide better floatation over the often muddy soil.

FIG. 5 shows another embodiment manure application toolbar 100 from the side. This includes a swing pipe 104, a swing pipe pivot 106, a swing pipe support 110, and a swing pipe support pivot 108. Swing pipe support pivot 108 in some embodiments, can be independently pivoted from the swing pipe pivot 106. A sludge distributor 112, shank 118, and coulter 116 may also be seen. The tongue 102 and wing wheels 114 are also shown.

FIG. 6 shows the embodiment of FIG. 4 in a top view. The left wing frame 89, wing overlap 83, center wheel frame 87, and right wing frame 91 may be seen. The wing overlaps 82 can overlap the center manure application frame and be pivoted or hinged at a point inward of the outermost extend of the center manure application frame. In some embodiments, the pivot point is located inward of the outermost extent of the center region wheels or tracks. The center wheel frame 87 secured to center wheels 94 and tongue 81 having a forward hitch 100 is shown. The pivotable center application portions 85, of the center region 84, which can lift the coulter and shanks off the ground, are shown. Sludge distribution manifolds 112 for feeding the manure injectors are shown.

FIG. 7 is an end fragmentary view of one embodiment of the invention. A cradle arm 120 coupled to a cradle arm hydraulic cylinder 122 is shown. A wing lifting arm 104, previously described is shown, coupled to a hydraulic cylinder 106 for raising and/or pivoting the wing manure applicators off the ground (depending on the embodiment) is shown.

What is claimed is:

1. An apparatus for applying manure to fields, the apparatus comprising:
    a main frame;
    the main frame including a rear region and a center longitudinal tongue member including a front hitch;
    a center wheel frame coupled to the frame rear region, the center wheel frame having support wheels and/or tracks for supporting the frame;
    a center manure application frame movably coupled to the main frame rear region so as to allow the center manure application frame to be raised off the ground, the center manure application frame having manure applicators; and
    a pair of wings coupled to more inward wing overlaps which are pivotally coupled to opposed sides of the main frame rear region and the wings having manure applicators for applying manure which are configured to touch the ground and at least one wheel and/or track on each wing to support the wing, where the pivotable coupling allows the wings and wing overlaps to move forward and inward toward the front and tongue respectively, and where the pivotable coupling allows the wings and wing overlaps to be raised off the ground,
    wherein the wing overlap has a length sufficient to allow the most inward manure applicator to clear the center frame wheels when the wings are pulled into the tongue while the wing wheels are on the ground.

2. The apparatus of claim 1 in which the pivotal coupling between the wing overlaps and the center wheel frame is located inward of the outer most extent of the center wheel frame.

3. The apparatus of claim 1 in which the tongue includes a forward portion and a rearward portion slidably disposed with respect to each other allowing the tongue to increase and decrease in length.

4. The apparatus of claim 3, having a pair of side struts each coupled to the tongue forward portion and rearward portion, such that extending the tongue length pulls the side wings forward and inward toward the tongue.

5. The apparatus of claim 1 including lifting cradles coupled to the frame and in which the wings and wing wheels can be lifted off the ground using the lifting cradles.

6. The apparatus of claim 1 in which the center manure applicators can be raised off the ground through a hydraulic cylinder coupled to the center application frame.

7. The apparatus of claim 1 having a manure supply swing pipe pivotally coupled to the frame such that the swing pipe is maintained at a constant height above the center wheels during use.

8. The apparatus of claim 2, in which the wing overlap pivotal coupling is located inward of the outermost extent of the center wheels.

9. A method for applying manure to a field using a tool bar, the toolbar including a center longitudinal tongue member including a front hitch and a rear region,
    a center frame coupled to the tongue rear region,
    at least one wheel and/or track coupled directly or indirectly to the center frame for supporting the center frame,
    a plurality of center discs and/or shanks coupled to the center frame,
    the center discs and/or shanks pivotally coupled to the center frame to raise the center disks and/or shanks off the ground,
    a pair of wings coupled to more inward wing overlaps, the wing overlaps pivotally coupled to the center frame to pivotally move the wings and wing overlaps forward and inward toward the front and inward respectively,
    the wings having wing discs and/or shanks for applying manure and at least one wheel and/or track each to support the wing,
    the wing overlaps being pivotally coupled to the center frame such that the wings and wing overlaps can be raised off the ground, wherein the wing overlap has a length sufficient to allow the most inward disc or shank to clear the center frame wheels when the wings are pulled into the tongue while the wing wheels are on the ground, the method comprising:

a tractor pulling the toolbar and supplying the toolbar with pumped manure which is applied using the discs and/or shanks.

10. The of claim 9 in which the wing overlap region pivotal coupling to the center wheel frame is located inward of the outer most extent of the center wheel frame, the method including pulling the wings inward and forward while the wing wheels are on the ground.

11. The method of claim 9 in which the tongue includes a forward portion and a rearward portion slidably disposed with respect to each other, further including a strut on each side of the tongue with each strut coupled to both the forward and rearward portion of the tongue, the method including sliding the forward portion and rearward portion apart to extend the tongue to pull the wings forward and inward.

12. The method of claim 9 in which the wings and wing wheels can be lifted off the ground using hydraulics, mechanics, or electronics or some combination thereof, the method including lifting the wings and wing wheels off the ground for transport.

13. The method of claim 9 in which the wing discs and/or shanks can be pivotally raised off the ground using hydraulics, mechanics, electronics or some combination thereof, the method including raising the wing discs and/or shanks off the ground while pulling the wings forward and inward.

* * * * *